(12) United States Patent
Donaldson

(10) Patent No.: US 6,234,418 B1
(45) Date of Patent: May 22, 2001

(54) LINE STORAGE DEVICE

(76) Inventor: Evan Donaldson, 2070 Sea Cliffway, San Bruno, CA (US) 94066

( * ) Notice: Subject to any disclaimer, the term of this patent is extended or adjusted under 35 U.S.C. 154(b) by 0 days.

(21) Appl. No.: 09/414,682

(22) Filed: Oct. 7, 1999

(51) Int. Cl.[7] .................................................. B65H 75/28
(52) U.S. Cl. .................... 242/402; 242/407; 242/580; 242/614; 191/12.2 R
(58) Field of Search .................... 242/397, 402, 242/405.1, 407, 580, 614; 191/12.2 R

(56) References Cited

U.S. PATENT DOCUMENTS

| 238,153 | 2/1881 | Piper . | |
|---|---|---|---|
| 2,082,489 | 6/1937 | Goldsmith | 242/55 |
| 2,184,363 | 12/1939 | Schultz | 299/77 |
| 4,467,979 | 8/1984 | Koehler | 242/96 |

*Primary Examiner*—John Q. Nguyen
(74) *Attorney, Agent, or Firm*—Goldstein & Canin

(57) ABSTRACT

A line storage device, for storing a line having two ends and a length, comprising a first plate and a second plate which are joined by a core. The first plate and second plate both have an outer side and an inner side. The plates are joined such that their inner sides face each other yet are separated by a substantially uniform gap. The outer surface of the first plate has several semicircular clips which allow the line to wind once around the circumference, and a pass through opening which then allows the line to pass through the first plate to the inner side thereof. An S-shaped channel in the first plate protrudes from the outer side of the first plate, but is open on the inner side thereof. The S-shaped channel allows the line to enter said channel at the pass-through opening, travel therethrough and exit at the core. Once the line exits the S-shaped channel at the core, it winds around the core numerous times in the gap between the plates to effect storage of the entire length of line. The line is then selectively secured to the second plate with a spiral clip.

7 Claims, 3 Drawing Sheets

LINE STORAGE DEVICE

BACKGROUND OF THE INVENTION

The invention relates to a line storage device. More particularly, the invention relates to a devices which allows effective storage of lines of all types, including extension cords, ropes, and the like on a reel, and allows a selected length thereof to be easily dispensed for use.

Line storage, especially extension cord storage, is a pervasive problem. Any line storage solution attempts to reconcile the dual goals of keeping the line free from tangles, while making the line readily accessible.

In addition, it is desirable that the line have sufficient length to be useable for any foreseeable application, although a considerably shorter length might often be necessary for a specific job. These two goals are also difficult to reconcile—a lengthy cord can be unmanageable in an application where only a short one is required, and a cord too short is clearly unusable in certain situations when greater length is needed.

Other attempts at solutions have resulted in various configurations. For example, U.S. Pat. No. 4,467,979 to Koehler discloses a cord reel designed for use with an electrical cord.

While these units may be suitable for the particular purpose employed, or for general use, they would not be as suitable for the purposes of the present invention as disclosed hereafter.

SUMMARY OF THE INVENTION

It is an object of the invention to produce a line storage device capable of storing a useful quantity of lines of various types, including electrical extension cords and ropes. Accordingly, a hub is provided upon which a considerable quantity of the line may be wound for storage, and unwound for use.

It is a further object of the invention to provide a line storage device which allows a precise length to be unreeled and maintained. Accordingly, spiral clips attach onto the line at a point of departure from the hub, and fasten into slots on the hub which thereby maintain a specific length of cord extending from the hub.

It is another object of the invention to provide a line storage device which prevents the line from being fully pulled from the hub, and in the case of electrical extension cords, prevents the male end thereof from being pulled from an electric outlet. Accordingly, an S-shaped channel is provided from the outer hub toward the inner hub to stop the line from being pulled completely from the hub. In the case of electrical extension cords, tension upon the free end is not transmitted to the male end.

It is a still further object of the invention that the line storage device is fully stackable. Accordingly, all components are contained within the confines of the flange lips extending from the first and second plates.

The invention is a line storage device, for storing a line having two ends and a length, comprising a first plate and a second plate which are joined by a core. The first plate and second plate both have an outer side and an inner side. The plates are joined such that their inner sides face each other yet are separated by a substantially uniform gap. The outer surface of the first plate has several semicircular clips which allow the line to wind once around the circumference, and a pass through opening which then allows the line to pass through the first plate to the inner side thereof. An S-shaped channel in the first plate protrudes from the outer side of the first plate, but is open on the inner side thereof. The S-shaped channel allows the line to enter said channel at the pass-through opening, travel therethrough and exit at the core. Once the line exits the S-shaped channel at the core, it winds around the core numerous times in the gap between the plates to effect storage of the entire length of line. The line is then selectively secured to the second plate with a spiral clip.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 6:
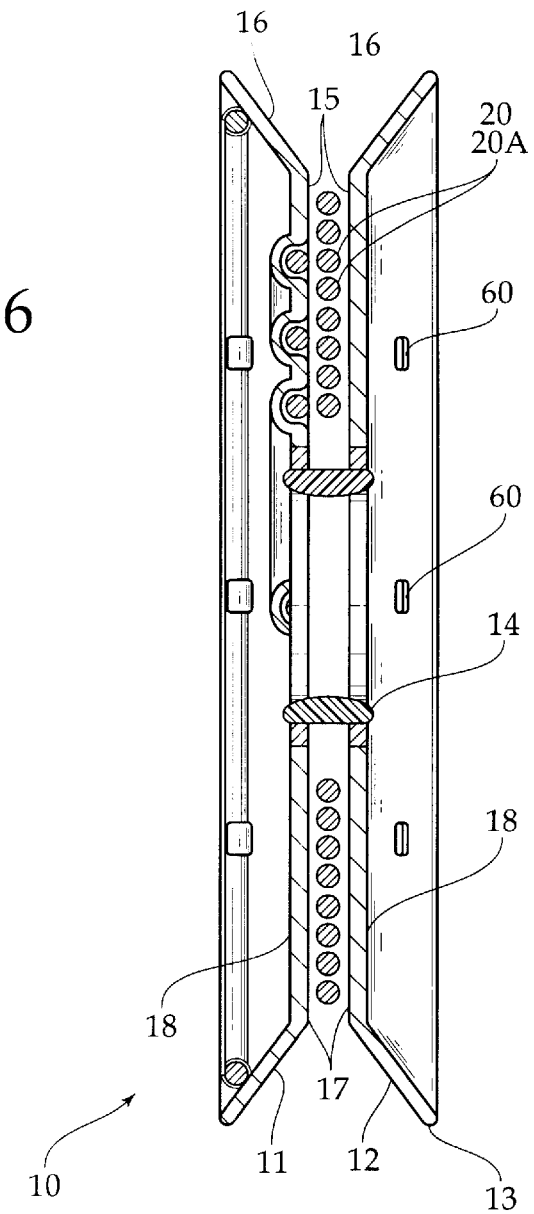
FIG. 6 is a cross sectional view of the assembled hub, but which is taken generally in the direction of line 6—6 in FIG. 3 where parts had already been removed.

FIG. 6 is a cross sectional view, which provides an overview of a line storage device 10, which comprises a first plate 11 and a second plate 12, each circular in shape having an outer circumference 13. The plates are joined by a core 14 to create an overall construction which may be referred to as a hub. The hub allows for winding and thus effective storage of a line 20, which herein is illustrated as an electrical cord 20A. However, lines of other types, including ropes and cables may be stored on the hub, and thus the invention is not limited to the storage of electrical cords.

As seen in FIG. 6, the electrical cord 20A is wound numerous times around the core 14, allowing a considerable length of said cord 20A to be stored on said core 14. The first plate 11 and the second plate 12 are each circular in shape, and each have a flat portion 15 and a flange lip 16 which extends fully therearound to create a bowl shape. The flat portions each have an inner side 17 which face each other, and an outer side 18 which face away from each other. The flat portions 16 are spaced apart by the core 14 in a parallel arrangement to provide a substantially uniform space or gap which allows the cord 20A to be wound therein. The flange lips 16 from the first plate 11 and second plate 12 face opposite directions, such that the hub is shaped like two back-to-back bowls separated by a substantially uniform width gap.

Figure 1:
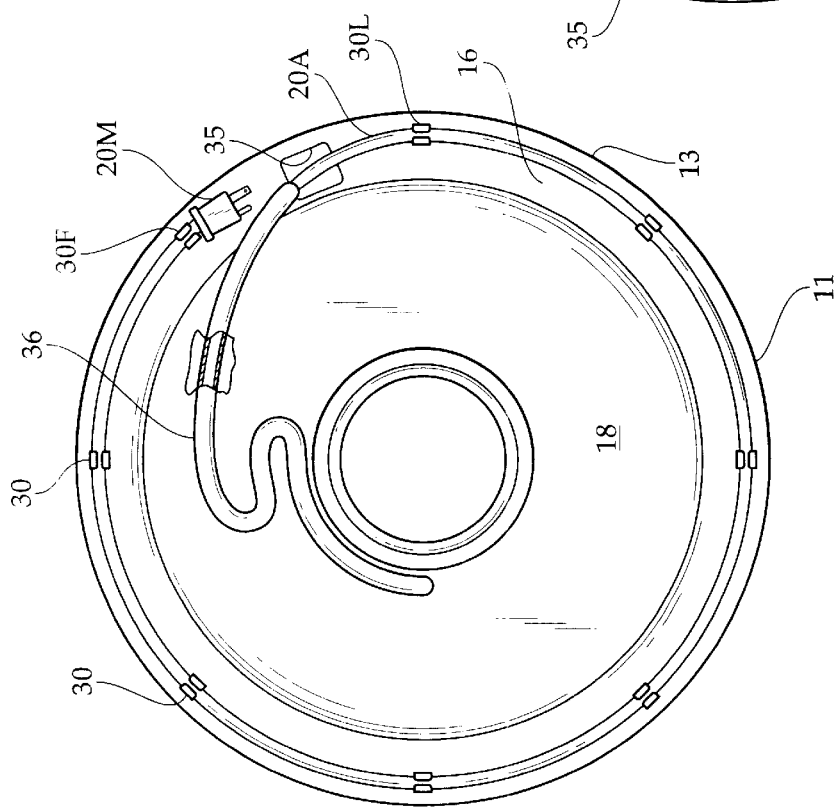
FIG. 1 is a side elevational view of the invention, showing an outer view of a first plate of the invention, with a portion thereof broken away to show the line extending within the S-shaped channel from the pass-through opening to the core.

Referring now to FIG. 1, the outer side 18 of the first plate 11 is illustrated. Also illustrated is a male end 20M of the electrical cord 20A. A series of semicircular clips 30 are disposed on the flange lip 16 near the circumference 13 on the outer side 18 of the first plate 11. The semicircular clips 30 are arranged in a path which includes a first semicircular clip 30F and a last semicircular clip 30L. A pass-through opening 35 is located between the first semicircular clip 30F and the last semicircular clip 30L. The male plug 20M is situated near the first semicircular clip 30F, the electrical cord wraps nearly once near the circumference 13, fastening into each of the semicircular clips 30 as said cord 20A travels therearound, until it reaches the last semicircular clip 30L. The cord then passes through the pass-through opening 35 and enters an S-shaped channel 36 which begins at the pass-through opening 35 and extends to the core 14.

Figure 2:
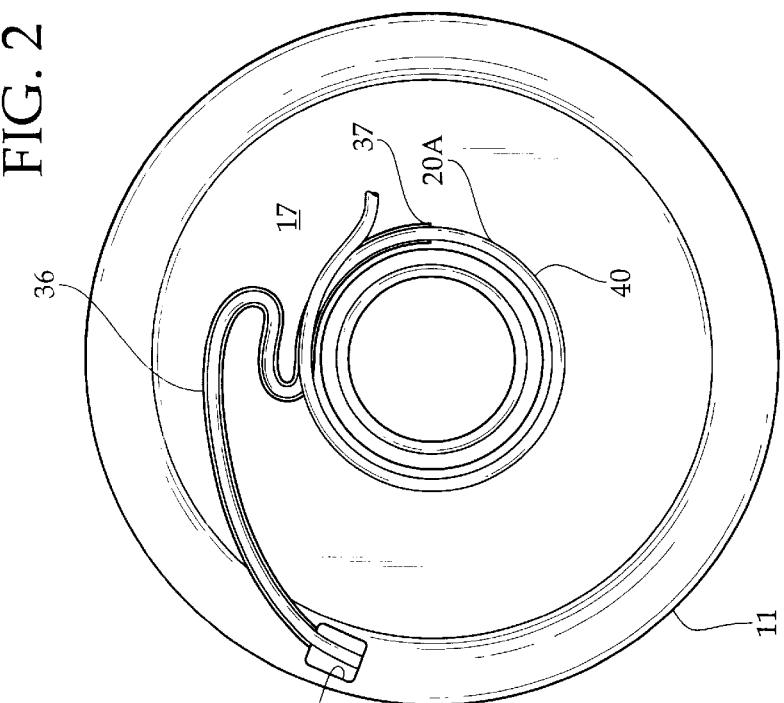
FIG. 2 is a side elevational view of the invention, wherein the second plate has been removed to show the inner side of the first plate, wherein the line is shown exiting the S-shaped channel and beginning to wrap around the core.

The S-shaped channel 36 is raised on the outer side 18 and thus is visible on the outer side 18 of the first plate 11, but the S-shaped channel 36 is open on the inner side 17 of the first plate 11, as seen in FIG. 2. In FIG. 2, the cord enters the S-shaped channel 36 at the pass through opening 35, and travels within the S-shaped channel 36 to the core 14, where it exits the S-shaped channel at a tangential opening 37 and begins wrapping around the core 14. As seen in FIG. 6, the cord 20A within the S-shaped channel 36 is recessed with respect to the inner face 17 of the first plate, but is exposed thereat, so that it said cord 20A does not interfere with the cord 20A wrapped around the core 14. The S-shaped channel 36 serves a purpose in that it prevents the cord from being pulled fully from the line storage device 10 by a radial force. The tangential opening 37 in particular prevents the radial force from pulling the cord from the S-shaped channel 36.

Figure 3:
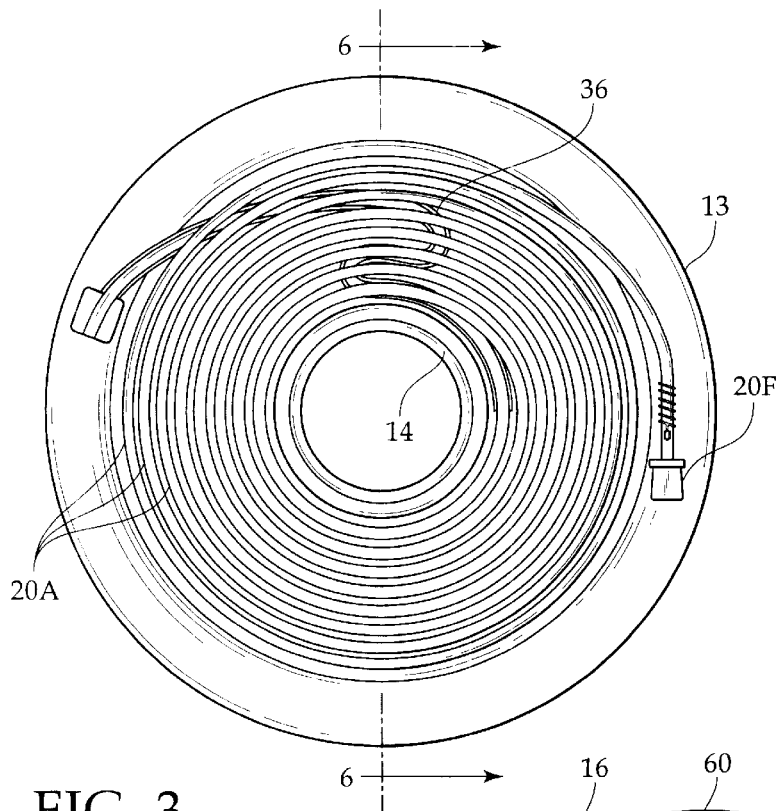
FIG. 3 is a side elevational view of the invention, showing the inner side of the second plate, wherein the line has been wrapped numerous times around the core, such that a considerable length of cord has been stored using the invention.

In FIG. 3, the cord 20A has been wrapped numerous times around the core 14. As illustrated, the cord wrapped around the core 14 neatly covers the portion of the cord that extends in the S-shaped channel 36 without interference therefrom. Once a considerable length of cord has been wrapped around the core 14, a female end 20F of the cord is then located near the outer circumference 13 of the hub.

Figure 5:
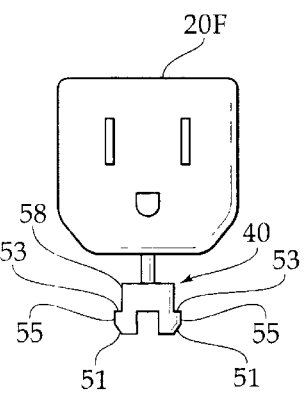
FIG. 5 is a front elevational view of a female plug, with a spiral clip according to the present invention attached thereto.
Figure 7:
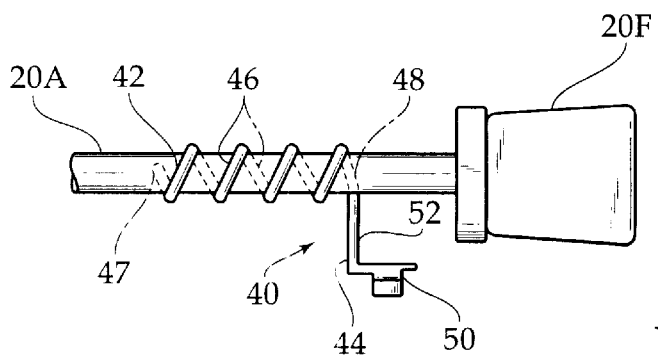
FIG. 7 is a side elevational view of the female plug, with the spiral clip attached immediately adjacent thereto.

Referring now to FIG. 5 and FIG. 7, a spiral clip 40 is provided for fastening the cord 20A to the hub. The spiral clip 40 is shown located just adjacent to the female end 20F of the cord 20A. The spiral clip 40 comprises a wrapping portion 42 and a clipping portion 44. The wrapping portion 42 comprises a coil 46, having a free end 47 and a fixed end 48. The fixed end 48 is attached to the clipping portion 44. The wrapping portion 42 may be secured onto the electrical cord 20A, or any other line or cylindrical object for that matter, by flexing the coil 46 at the free end 47 and urging the coil to then begin curving around the cord 20A. The coil is then rolled around the cord so that the coil reconfigures itself around the cord. Once the wrapping portion 42 has been thus secured onto the cord 20A, the clipping portion 44 may then be used to attach the cord 20A to another object.

The clipping portion 44 comprises a tab 50, and a mast 52 which attaches the tab 50 to the coil of the wrapping portion 42. The tab 50 comprises a block-like tab body 58 and a pair of flexible projections 55 which are biased outward, and normally extend beyond the tab body 58.

Figure 4:
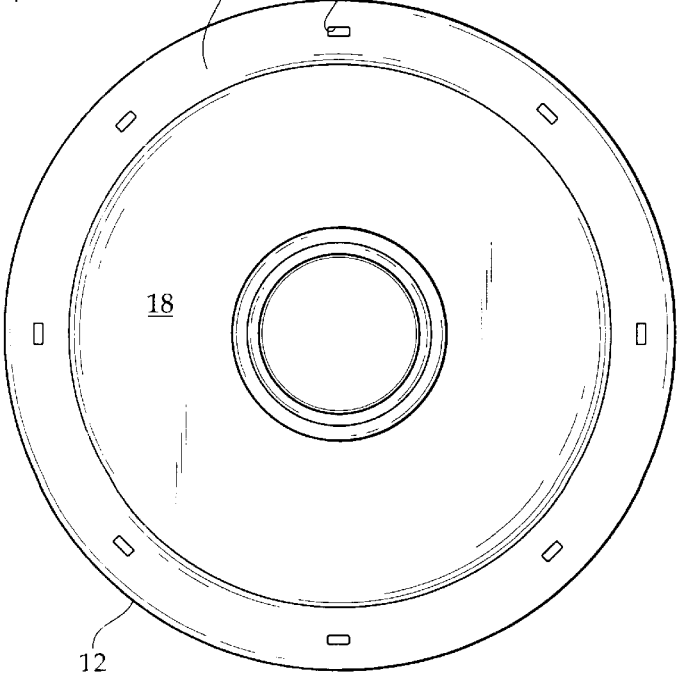
FIG. 4 is a side elevational view of the inner side of the second plate, with the first plate removed therefrom.

As seen in FIG. 4 and FIG. 6, a plurality of slots 60 are arranged around the flange lip 16 of the second plate 12. These slots 60 are sized to secure the tab 50 of the clipping portion 44. Accordingly, each slot 60 is substantially the same in width as the tab body 58. To secure the tab 50 into one of the slots 60, the flexible projections 55 are urged into the slot 60 until they flex inward, allowing the tab body 58 to seat within the slot 60, and the flexible projections 55 then reflex outward, locking the tab into the slot 60. Inwardly angled edges 51 are provided on the flexible projections 55 opposite from the tab body to cause the flexible projections 55 to flex inward upon contact with one of the slots 60. Flat perpendicular edges 53 are provided on the flexible projections 55 adjacent and perpendicular to the tab body 58 to seat around the slots 60 at the outer side of the second plate and to thus securely maintain the tab 50 in said slot 60.

In use, the male end 20M of the cord 20A is detached from some or all of the semicircular clips beginning with the first semicircular clip, to the extend necessary to plug the male end 20M into an AC source. Then, the female end is freed by releasing the spiral clip which typically secures the female end during storage. The spiral clip is released by urging the flexible projections 55 toward each other at the outer side 18 of the second plate 12 while pulling the spiral clip free of the slot 60 from the inner side 17 of the second plate 23. The now freed female end may be pulled from the hub, along with any desired length of cord. Once the desired length of cord has been removed, the spiral clip may be reattached to the cord at its point of departure from the hub, and the cord may be fastened to the hub by attaching the tab into one of the slots. The useable length is thereby securely set.

In conclusion, herein is presented a line storage device which provides convenient and effective storage for a line, cord, rope, or the like, and allows the same to be conveniently deployed at a desired length.

What is claimed is:

1. A line storage device, for storing and deploying a line having two ends and a length between the two ends, comprising:

a core;

a first plate and a second plate, each circular in shape having an outer circumference, the first plate and second plate each having an inner side and an outer side, the first plate and second plate each having a flat portion, the first plate and second plate joined by the core such that their inner sides face each other, wherein the first plate and second plate extend substantially parallel at their flat portions such that a space of uniform width is created therebetween; and the first plate having a pass-through opening between the inner side and outer side thereof near the outer circumference, the first plate having an S-shaped channel extending from adjacent to the pass-through opening to the core, the S-shaped channel having a tangential opening near the core, the S-shaped channel protruding from the outer side of the first plate but open at the inner side of the first plate, such that the line may travel through the pass-through opening into the S-shaped channel thereat, the line exiting the S-shaped channel adjacent to the core at the tangential opening and then winding around the core numerous times to effect storage of the length of line, wherein the line winds over and across the S-shaped channel without interference therefrom.

2. The line storage device of claim 1, further comprising a plurality of semicircular clips, each located near the outer circumference on the outer side of the first plate, including a first semicircular clip and a last semicircular clip, the first and last semicircular clip located on opposite sides of the pass-through opening, so that one end of the line may be attached into the first semicircular clip, the line then attaching into each of the semicircular clips until the last semicircular clip is reached, before the line then extends into the pass-through opening.

3. The line storage device of claim 2, wherein the first plate and second plate each have a flange lip extending outward, the semicircular clips located on the flange lip of the first plate.

4. The line storage device of claim 3, wherein the second plate further comprises a plurality of slots on its flange lip.

5. The line storage device of claim 4, further comprising at least one spiral clip, the spiral clip comprising a wrapping portion and a clipping portion, the wrapping portion wraps around the line and the clipping portion secures into one of the slots to secure the line to the second plate thereat.

6. The line storage device of claim 5, wherein the wrapping portion of the spiral clip comprises a coil having an open end and a fixed end, the fixed end attached to the clipping portion.

7. The line storage device of claim 6, wherein the clipping portion comprises a tab having a tab body sized to fit snugly within one of the slots, and a pair of flexible projections which flex inward to allow the tab body to pass into the slot from the inner side of the second plate, and then flex outward at the outer side of the second plate to secure the tab in the slot.

* * * * *